(12) United States Patent
Moghadam (10) Patent No.: US 10,262,320 B2
(45) Date of Patent: Apr. 16, 2019

(54) ADDING CARD TO MOBILE WALLET USING NFC

(71) Applicant: PAYPAL, INC., San Jose, CA (US)

(72) Inventor: Ali Minaei Moghadam, Haywards Heath (GB)

(73) Assignee: PAYPAL, INC., San Jose, CA (US)

( * ) Notice: Subject to any disclaimer, the term of this patent is extended or adjusted under 35 U.S.C. 154(b) by 0 days.

(21) Appl. No.: 15/408,359

(22) Filed: Jan. 17, 2017

(65) Prior Publication Data

US 2017/0124568 A1    May 4, 2017

Related U.S. Application Data

(63) Continuation of application No. 14/963,167, filed on Dec. 8, 2015, now Pat. No. 9,547,857, which is a continuation of application No. 13/757,408, filed on Feb. 1, 2013, now Pat. No. 9,218,624.

(60) Provisional application No. 61/594,806, filed on Feb. 3, 2012.

(51) Int. Cl.
| | |
|---|---|
| *G06Q 20/34* | (2012.01) |
| *G06Q 40/04* | (2012.01) |
| *H04W 4/80* | (2018.01) |
| *G06Q 20/32* | (2012.01) |
| *G06Q 20/36* | (2012.01) |
| *G06Q 20/40* | (2012.01) |
| *G06K 7/10* | (2006.01) |
| *H04W 88/02* | (2009.01) |

(52) U.S. Cl.
CPC ..... *G06Q 20/3567* (2013.01); *G06K 7/10366* (2013.01); *G06Q 20/3278* (2013.01); *G06Q 20/352* (2013.01); *G06Q 20/3672* (2013.01); *G06Q 20/3674* (2013.01); *G06Q 20/4012* (2013.01); *G06Q 20/4018* (2013.01); *G06Q 40/04* (2013.01); *H04W 4/80* (2018.02); *H04W 88/02* (2013.01)

(58) Field of Classification Search
CPC .............. G06Q 30/06; G06Q 20/3567; G06Q 20/3278; G06Q 20/352; G06Q 20/3674; G06Q 20/4012; G06Q 20/4018; G06Q 40/04
USPC ................................ 235/379; 705/26.1, 27.2
See application file for complete search history.

(56) References Cited

U.S. PATENT DOCUMENTS

| | | | |
|---|---|---|---|
| 5,960,411 A * | 9/1999 | Hartman | G06Q 10/087 |
| | | | 705/26.8 |
| 6,760,470 B1 * | 7/2004 | Bogosian | G06K 9/186 |
| | | | 235/380 |
| 8,613,066 B1 | 12/2013 | Brezinski et al. | |
| 8,688,540 B1 * | 4/2014 | Patel | G06Q 30/00 |
| | | | 705/26.1 |
| 8,762,216 B1 | 6/2014 | Bhosle | |
| 9,111,307 B1 * | 8/2015 | Hanni | G06Q 30/0613 |
| 9,123,069 B1 * | 9/2015 | Haynes | G06Q 30/0625 |

(Continued)

*Primary Examiner* — Daniel A Hess
(74) *Attorney, Agent, or Firm* — Haynes and Boone, LLP (57) ABSTRACT

A user enables a communication, such as through a tap, between an NFC-enabled payment or funding card and a mobile device. Card information, such as the card number, type, and expiration date, are read by the mobile device. The user is then authenticated through the user device, such as by entering a CVV code, a PIN for the card, a cardholder name, and/or a billing address for the card. If confirmed, the card is added to the user's mobile/cloud wallet.

20 Claims, 8 Drawing Sheets

(56) References Cited

U.S. PATENT DOCUMENTS

| | | |
|---|---|---|
| 9,218,624 B2 | 12/2015 | Moghadam |
| 9,547,857 B2 * | 1/2017 | Moghadam ............ G06Q 40/04 |
| 2004/0243832 A1 | 12/2004 | Wilf et al. |
| 2009/0191811 A1 | 7/2009 | Griffin et al. |
| 2011/0276511 A1 | 11/2011 | Rosenberg |
| 2012/0101939 A1 | 4/2012 | Kasower |
| 2012/0290449 A1 * | 11/2012 | Mullen ................. G06Q 10/00 705/27.2 |

* cited by examiner

ADDING CARD TO MOBILE WALLET USING NFC

CROSS REFERENCE TO RELATED APPLICATION

This application is a continuation application to U.S. patent application Ser. No. 14/963,167, filed Dec. 8, 2015, which is a continuation of U.S. patent application Ser. No. 13/757,408, filed Feb. 1, 2013, now issued U.S. Pat. No. 9,218,624 and claims priority to U.S. Provisional Appl. Ser. No. 61/594,806, filed Feb. 3, 2012, which is incorporated by reference in its entirety.

BACKGROUND

Field of the Invention

The present invention generally relates to funding instruments, and in particular, to adding a funding instrument to a mobile/cloud wallet.

Related Art

Mobile or cloud based wallets are becoming more popular due to the convenience of being able to make a payment or purchase from the user's mobile device or smart phone. Payment and service providers are providing this functionality to users, such as through a mobile app on the phone that allows a user to make a payment through a third party payment provider, such as PayPal Inc. of San Jose, Calif., or through a credit card issuer or bank. Typically, the user has to add a payment card into the mobile/cloud wallet, which can be time-consuming and inconvenient.

For example, the user may have to first access a site of the provider offering the mobile/cloud wallet service. This usually requires the user to go to the site via a PC or other computing device and enter log in credentials, such as a user name and password. The user may then have to manually enter specific information about the funding card, such as a card number, expiration date, type of card, CVV code, billing address, name on the card, and a phone number. This can be especially problematic on mobile devices with small keyboards or keypads or if the user is a country requiring programming by a third party.

Therefore, a need exists to allow users to easily enter a funding card into a mobile/cloud wallet.

Embodiments of the present disclosure and their advantages are best understood by referring to the detailed description that follows. It should be appreciated that like reference numerals are used to identify like elements illustrated in one or more of the figures, wherein showings therein are for purposes of illustrating embodiments of the present disclosure and not for purposes of limiting the same.

DETAILED DESCRIPTION

According to one embodiment, a user enables a communication, such as through a tap, between an NFC-enabled payment or funding card and a mobile device. Card information, such as the card number, type, and expiration date, are read by the mobile device. The user is then authenticated through the user device, such as by entering a CVV code, a PIN for the card, a cardholder name, and/or a billing address for the card. If confirmed, the card is added to the user's mobile/cloud wallet.

As a result, a funding card is easily added to a user's mobile/cloud wallet through an NFC communication between the card and the mobile device, with minimal user data entry.

Figure 1:
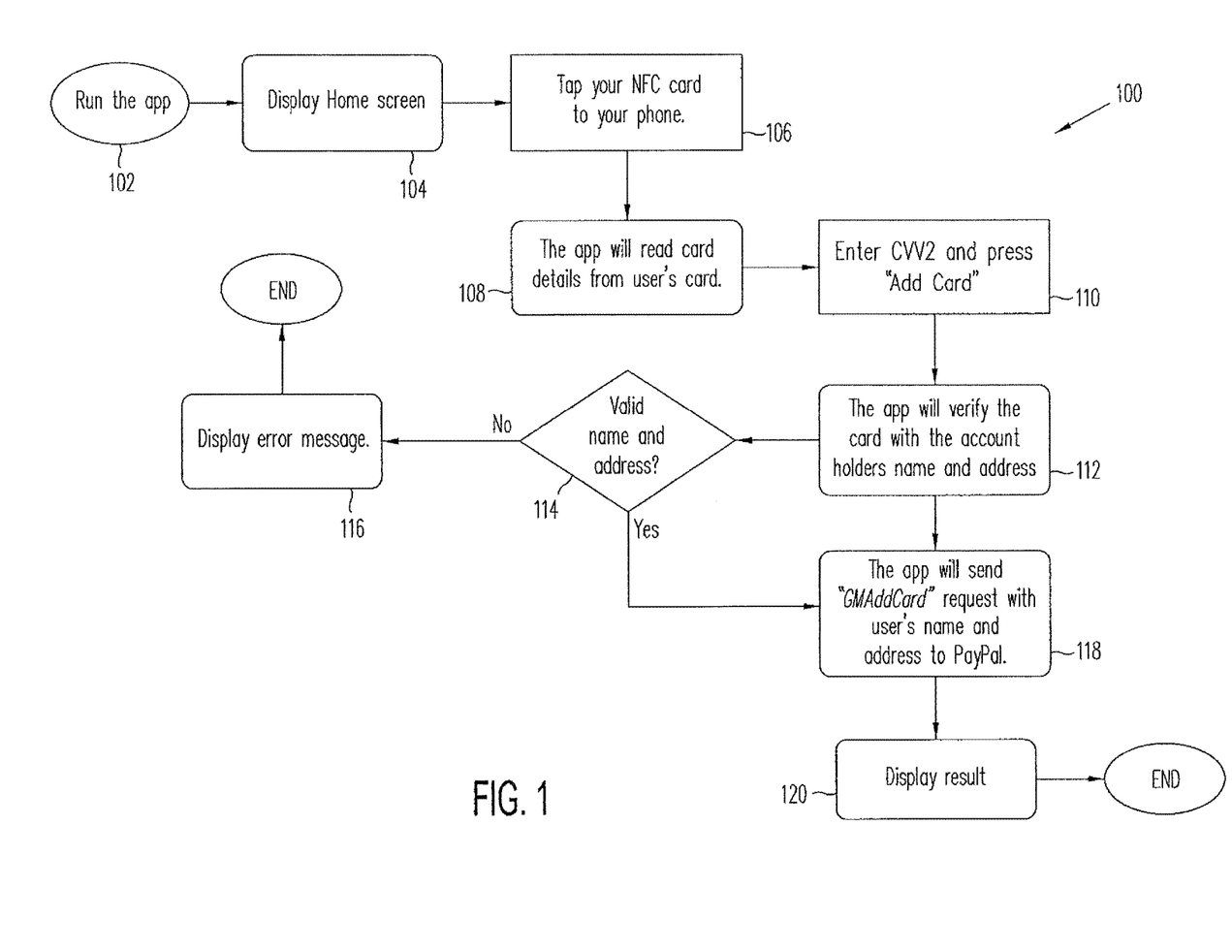
FIG. 1 is a flowchart showing a process for adding a funding card to a mobile/cloud wallet according to one embodiment.

FIG. 1 is a flowchart showing a process 100 for adding a funding card to a mobile/cloud wallet according to one embodiment. At step 102, a user runs or launches a mobile app on a user mobile device, such as a smart phone or computing tablet. The app may be downloaded from a payment provider, such as PayPal Inc. of San Jose, Calif., or other service provider. To launch or run the app, the user may tap or otherwise select the appropriate app from the mobile device screen. As used herein, the payment provider is one who provides a wallet service to the user or customer, such as a third party payment provider. In other embodiments, the user may access the payment provider service through a mobile browser or other means.

Once launched, a home screen may be displayed, at step 104, on the user device. If not already authenticated or logged on through the mobile device, the user may be requested to enter log in information, such as a user name, email address, phone number, password, and/or PIN. Some authentication or login information, such as the user name, email address, or phone number, may be saved or automatically populated when the app is launched. The home screen may include a tab or other indicator that allows the user to select the option of adding an NFC (Near Field Communication)-enabled card to the user's account. An NFC-enabled card allows information contained within the card, such as in the form of an RFID or other NFC chip, to be communicated to another device that is capable of reading the NFC-enabled card. Once the option to add a card is selected, the user may be requested, such as with instructions on the mobile device display, to tap the NFC card with (or otherwise bring it is close proximity to, including physical contact, with) the user's mobile device. Note that other forms of communication between an NFC card and the mobile device may be possible where card information is electronically communicated to the mobile device.

At step 106, the user taps the mobile device with the NFC-enabled card or vice versa or by other means for the mobile device to read information contained within the card. The card can be a credit card, a debit card, or other suitable funding instrument, embedded with an NFC chip to allow the information from the card to be communicated to an NFC reader or device capable of reading an NFC chip.

At step 108, the user's mobile device, which is capable of communicating with an NFC device, reads information from the card. Information may include the card number, card type (e.g., MasterCard, Visa, American Express, Wells Fargo, etc.), expiration date, issuing bank, etc. The mobile device may have a built-in NFC reader or be adapted to receive an external NFC reader, such as through an I/O port on the device. In other embodiments, additional or different information may be read as desired by the payment provider.

After the desired information is read, the mobile device displays the information. In one embodiment, only a partial card number, such as the last four digits, is displayed for security reasons. In another embodiment, the complete card number is displayed. The user may revise or edit any information that is not correct.

The display also includes a blank field for a card security code (CSC), also referred to as Card Verification Data (CVD), Card Verification Value (CVV or CVV2), Card Verification Value Code (CVVC), Card Verification Code (CVC or CVC2), Verification Code (V-Code or V Code), or Card Code Verification (CCV). This is usually a three or four digit numerical code on the card. If/once the displayed card information is correct, the user enters the card security code, at step 110, into the blank field, such as through the mobile device keyboard/keypad or through a voice data entry function.

Once entered, the user may send the information to the payment provider, such as by selecting or tapping an appropriate button like "Add Card," "Submit," etc.

Next, at step 112, the user's name and address are obtained, such as by the app or payment provider, and compared with the name and address associated with the card. For example, the user's name and address may be associated with the user's account with the payment provider and stored in a database of the payment provider. In another embodiment, the payment provider may request the user to enter the user's name and/or address on the mobile device, which can be through text or voice. The payment provider may communicate with the card issuer or other service to determine the name and address associated with the card.

Once the name and address of the user and account holder are obtained, a determination is made, at step 114, whether the names and addresses match. If not, an error message is displayed, at step 116, on the user device. The user may be given the opportunity enter or re-enter information for another determination.

If, as determined, the names and addresses match, the app may send the card request, at step 118, to the payment provider, along with the user's name and address. This step may be skipped if the payment provider already has this information and has matched the names and addresses. Communications between the payment provider and mobile device may be secure or encrypted for additional security.

The payment provider processes the information to add the NFC-enabled card to the user's account. The user may see a processing indication on the user's device. Once completed, the user device displays, at step 120, a message to the user that the card has been added.

As a result, the user is able to quickly and easily add an NFC-enabled funding card to the user's account or mobile/cloud wallet.

Figure 2A:
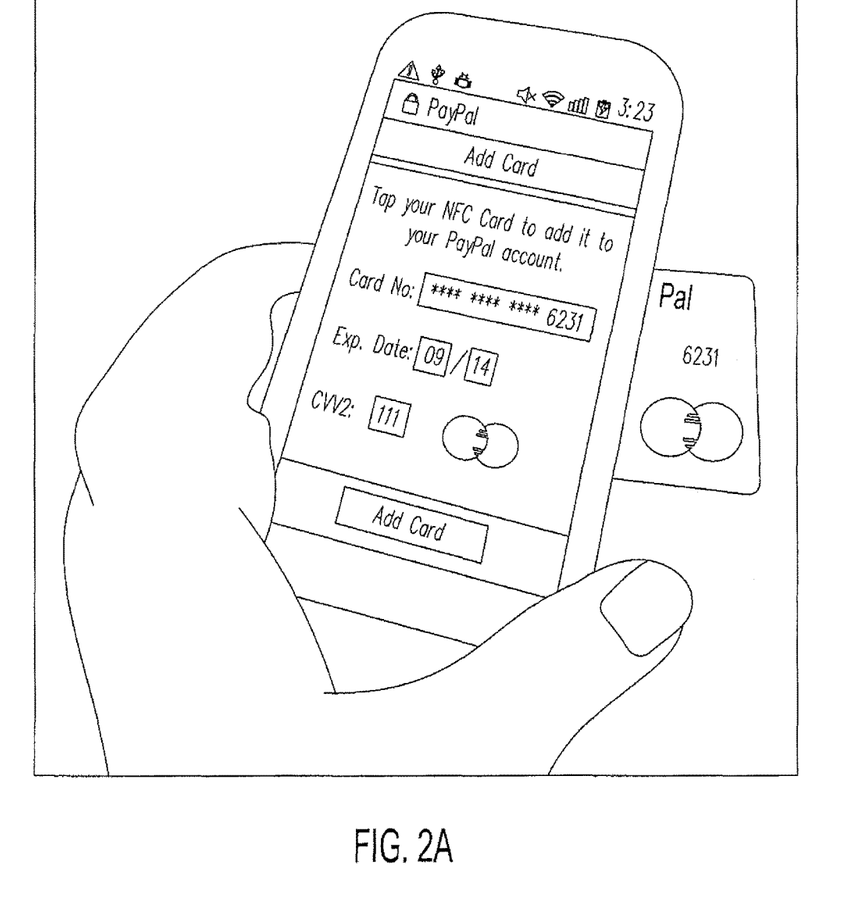
FIGS. 2A-2D are exemplary screen shots for adding a funding card according to the embodiment of FIG. 1.

FIGS. 2A-2D are exemplary screen shots on a user smart phone for adding a funding card according to the embodiment of FIG. 1. In FIG. 2A, the user has accessed the user's account with the payment provider, such as by launching the payment provider app on the user device and entering a PIN or password with a user identifier (name, email, phone number) if needed. The user has selected an option to add a funding card to the user's account and tapped the card with the smart phone. The smart phone reads the information contained in the card and displays, to the user, a card number with only the last four digits shown, the expiration date of the card, and the type of card. If any of the information is incorrect, the user may revise, such as by manually entering in data or having the card read again by the smart phone.

Figure 2B:
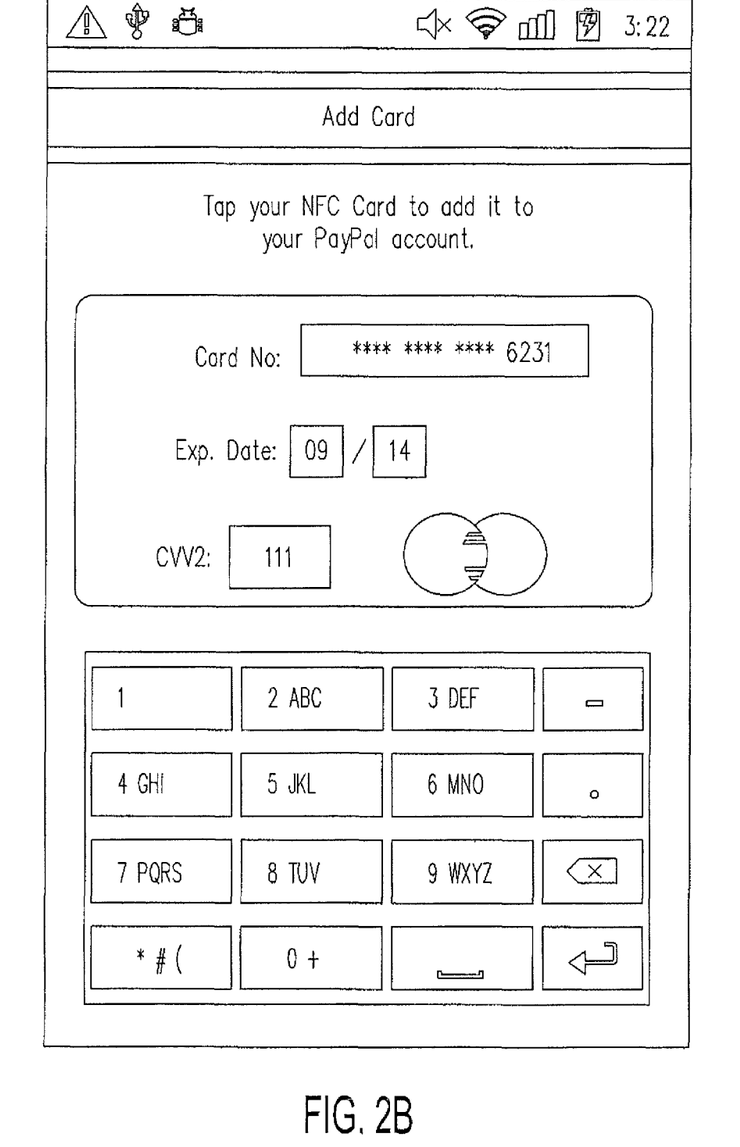

A blank field or box is also shown for the user to enter the card's CVV2 number. The user taps the empty box, which then allows the user to enter the CVV2 number. In FIG. 2B, the user enters the CVV2 number into the box using the virtual keypad on the device. The user may then tap a "return," "Done," "Submit," "Add Card," or other suitable button to submit the card information.

Figure 2C:
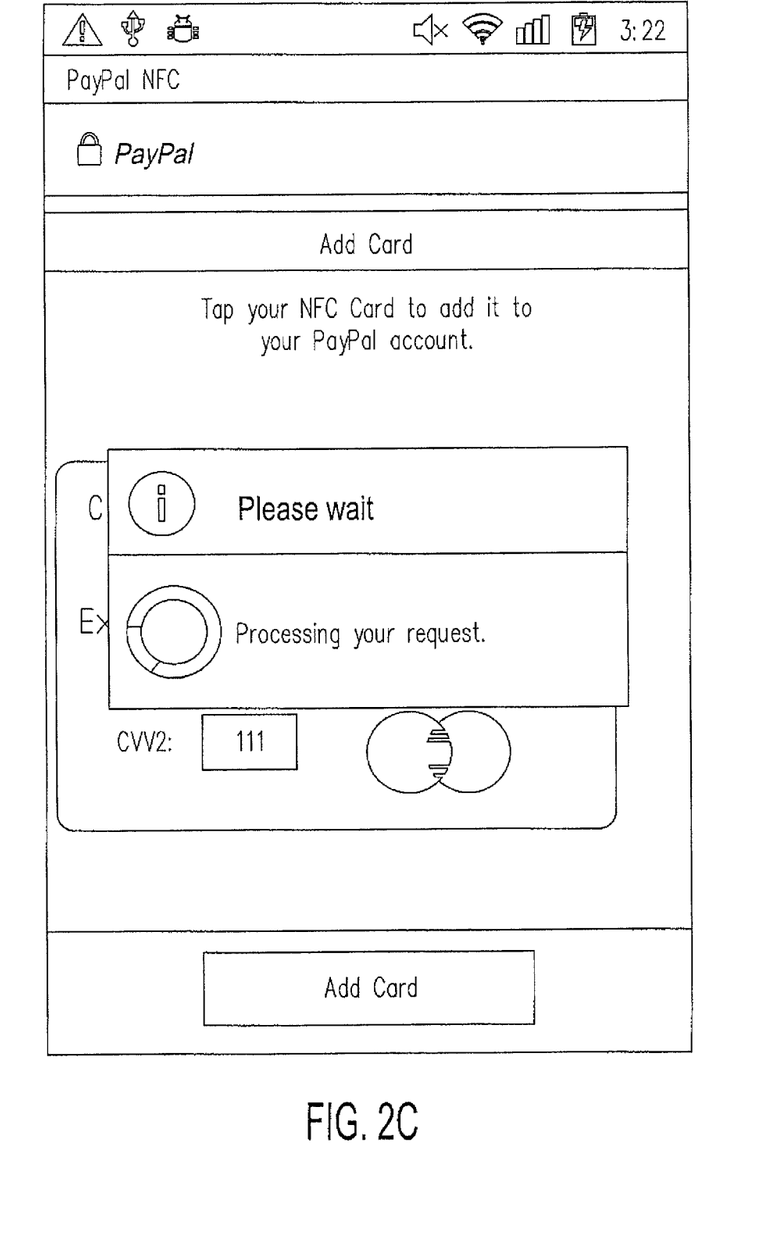
Figure 2D:
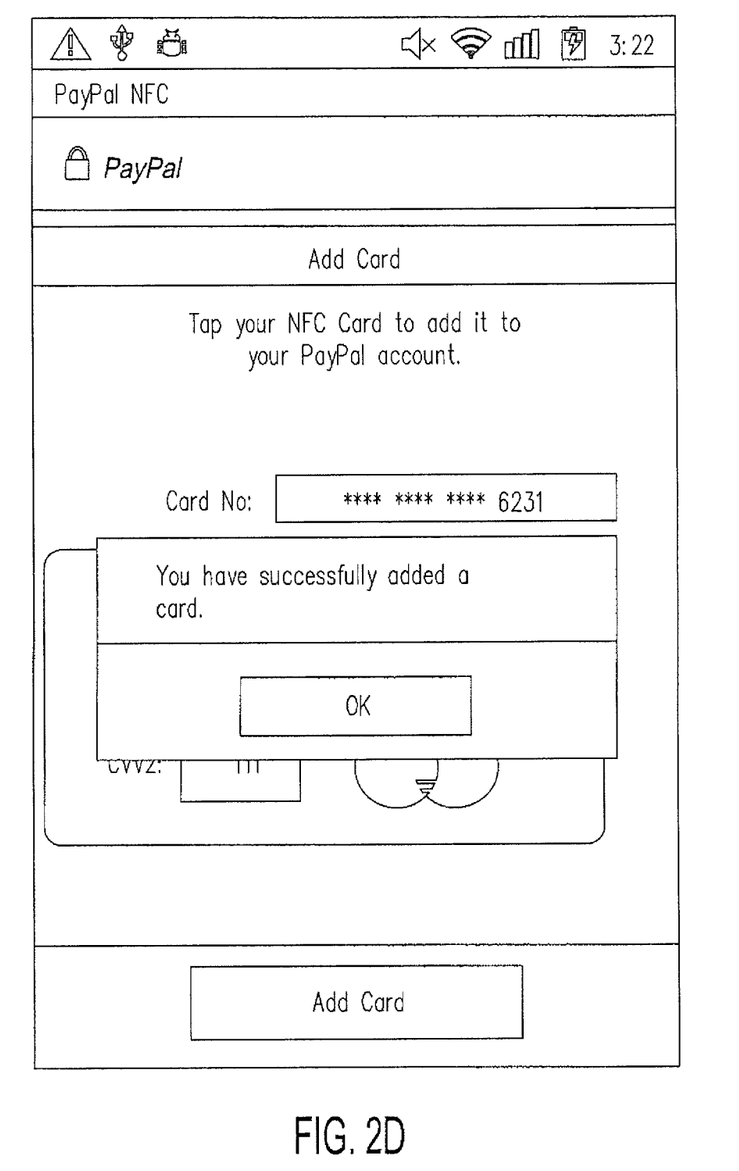

Once submitted, the user sees a processing pop-up screen in FIG. 2C, which shows the user that the information has been received and is being processed. Once processing is completed, the user is shown another pop-up screen that notifies the user that the card has been successfully added to the user's account.

Thus, the user simply had to tap the card and enter a security code to add a funding card.

Figure 3:
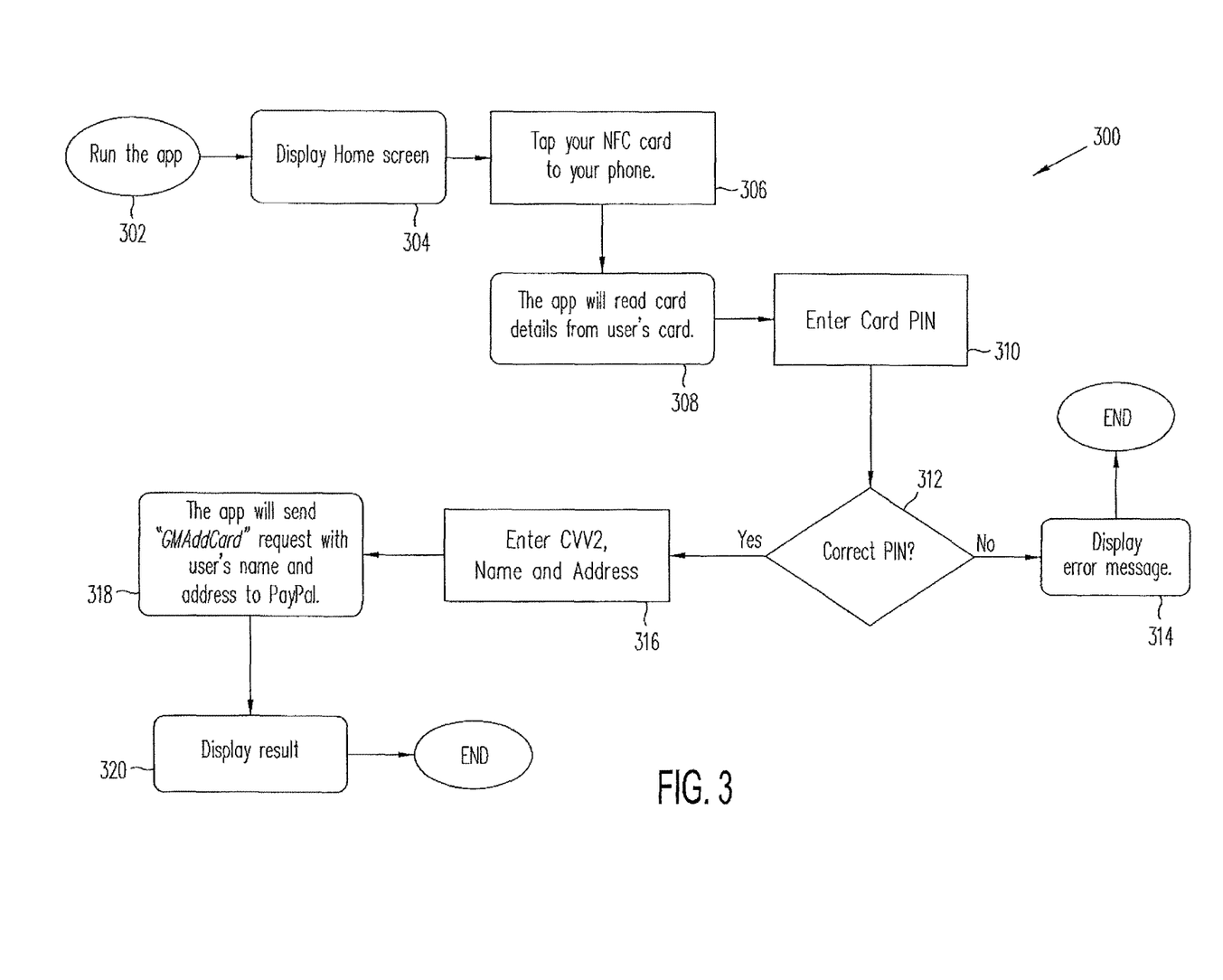
FIG. 3 is a flowchart showing a process for adding a funding card to a mobile/cloud wallet according to another embodiment.

FIG. 3 is a flowchart showing a process 300 for adding a funding card to a mobile/cloud wallet according to another embodiment. At step 302, a user launches/runs a mobile app on a user mobile device, such as a smart phone or computing tablet. The app may be downloaded from a payment provider, such as PayPal Inc. of San Jose, Calif., or other service provider. For example, the user may tap or otherwise select the appropriate app from the mobile device screen.

Once launched, a home screen may be displayed, at step 304, on the user device. If not already authenticated or logged on through the mobile device, the user may be requested to enter log in information, such as a user name, email address, phone number, password, and/or PIN. Some of the information may be saved or automatically populated when the app is launched. The home screen may include a tab or other indicator that allows the user to select the option of adding an NFC card to the user's account. Once selected, the user may be requested, such as instructions on the mobile device display, to tap the NFC card with the user's mobile device. Note that other forms of communication between an NFC card and the mobile device may be possible.

At step 306, the user taps the mobile device with the NFC-enabled card. The card can be a credit card, a debit card, or other suitable funding instrument, embedded with an NFC chip to allow the information from the card to be communicated to an NFC reader or device capable of reading an NFC chip.

At step 308, the user's mobile device, which is capable of communicating with an NFC device, reads information from the card. Information may include the card number, card type (e.g., MasterCard, Visa, American Express, Wells Fargo, etc.), and expiration date. In other embodiments, additional or different information may be read as desired by the payment provider.

After the desired information is read, the user is requested to enter the PIN for the card at step 310. The PIN may be entered on the user device by text or other secure means. Once the desired PIN is entered by the user, a determination is made, at step 312, whether the entered PIN matches the PIN associated with the card. The payment provider may communicate with the card issuer or other service to obtain the PIN associated with the card.

If the expected PIN and the entered PIN do not match, an error message is displayed, at step 314, on the user device. The user may be given the opportunity re-enter a PIN another determination.

If the expected and entered PIN match, as determined a step 312, the mobile device displays card information and requests additional information, at step 316. In one embodiment, only a partial card number, such as the last four digits, is displayed for security reasons. In another embodiment, the complete card number is displayed. Note that the card information may be displayed at other times, such as when the user enters the PIN at step 310. The display also includes a blank field for a card security code (CSC), the user name for the card, and billing address.

The user enters the requested information, CSC, name, and address, at step 316, into the blank fields, such as through the mobile device keyboard/keypad or through a voice data entry function. In different embodiments, different information may be requested of the user. Once entered, the user may send the information to the payment provider, such as by selecting or tapping an appropriate button like "Add Card," "Submit," etc.

In one embodiment, the information is then compared with what is expected of the user and the card to determine whether information (e.g., CSCs, names, and addresses) match. If not, an error message may be displayed on the user device, and the user may be given the opportunity enter or re-enter information for another determination.

If the entered and expected information matches, the App may send the card request, at step 318, to the payment provider, along with the user's name and address. This step may be skipped if the payment provider already has this information and has matched the CSCs, names, and addresses.

The payment provider processes the information to add the NFC-card to the user's account. The user may see a processing indication on the user's device. Once completed, the user device displays, at step 320, a message to the user that the card has been successfully added.

Note that one or more of the steps described herein may be omitted, combined, and/or performed in a different order as desired. A common step in one embodiment shares the same or similar features described with the corresponding step in the other embodiment.

Figure 4:
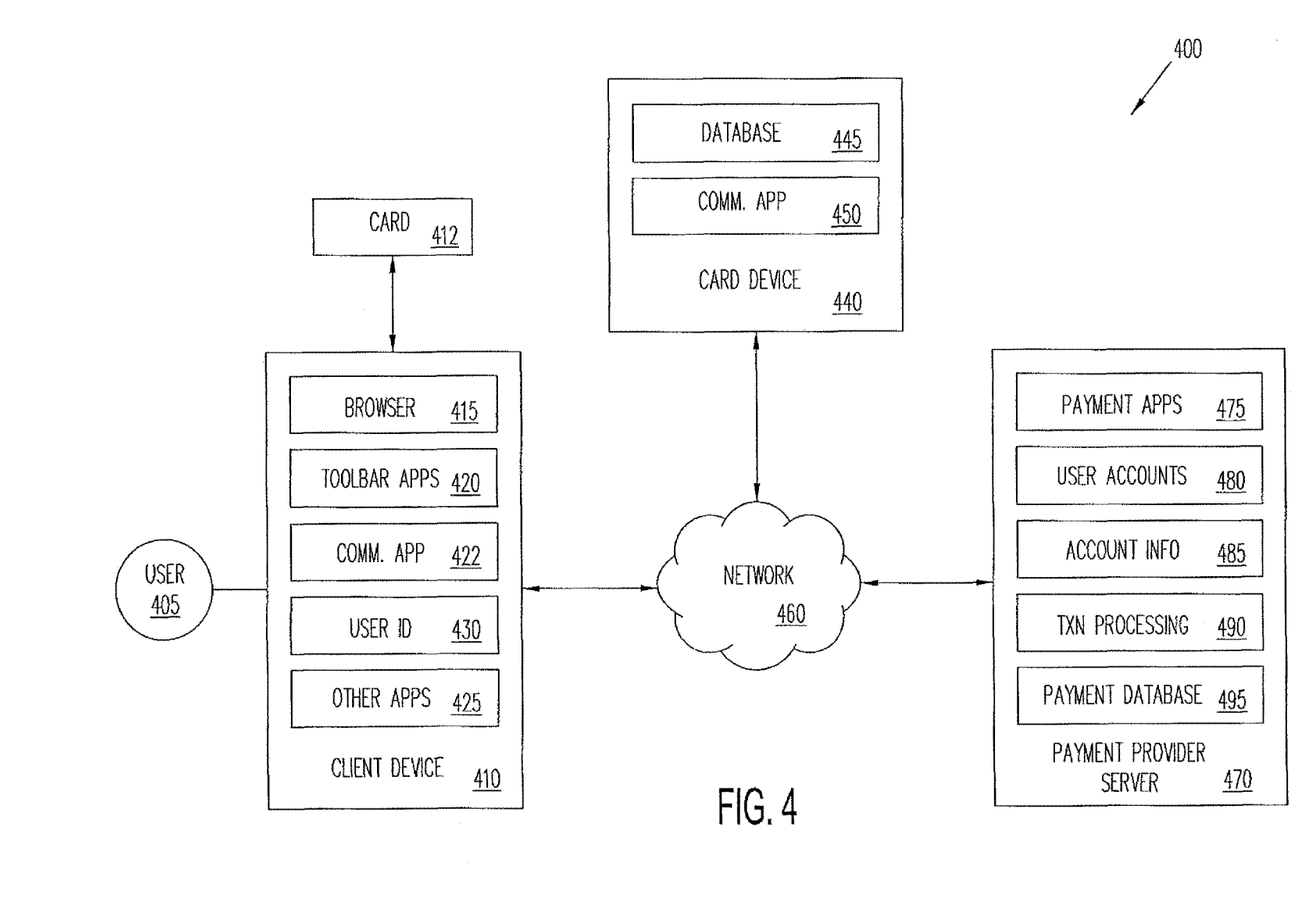
FIG. 4 is a block diagram of a networked system suitable for implementing the process of FIGS. 1 and 3 according to an embodiment.

FIG. 4 is a block diagram of a networked system 400 configured to add a card from a user device, such as described above, in accordance with an embodiment of the invention. System 400 includes a user device 410, an NFC-enabled card 412, a card issuer device 440, and a payment provider server 470 in communication over a network 460. Payment provider server 470 may be maintained by a payment provider, such as PayPal, Inc. of San Jose, Calif. A user 405 is associated with user device 410, where the user is able to add card 412 to a user account using payment provider server 470. Card 412 may have an active or passive NFC chip embedded within or attached thereto.

User device 410, card issuer device 440, and payment provider server 470 may each include one or more processors, memories, and other appropriate components for executing instructions such as program code and/or data stored on one or more computer readable mediums to implement the various applications, data, and steps described herein. For example, such instructions may be stored in one or more computer readable media such as memories or data storage devices internal and/or external to various components of system 400, and/or accessible over network 460.

Network 460 may be implemented as a single network or a combination of multiple networks. For example, in various embodiments, network 460 may include the Internet or one or more intranets, landline networks, wireless networks, and/or other appropriate types of networks.

User device 410 may be implemented using any appropriate hardware and software configured for wired and/or wireless communication over network 460. For example, in one embodiment, the user device may be implemented as a personal computer (PC), a smart phone, personal digital assistant (PDA), laptop computer, and/or other types of computing devices capable of transmitting and/or receiving data, such as an iPad™ from Apple™.

User device 410 may include one or more browser applications 415 which may be used, for example, to provide a convenient interface to permit user 405 to browse information available over network 460. For example, in one embodiment, browser application 415 may be implemented as a web browser configured to view information available over the Internet. User device 410 may also include one or more toolbar applications 420 which may be used, for example, to provide client-side processing for performing desired tasks in response to operations selected by user 405. In one embodiment, toolbar application 420 may display a user interface in connection with browser application 415.

User device 410 may further include other applications 425 as may be desired in particular embodiments to provide desired features to user device 410. For example, other applications 425 may include an application to add NFC card 412, security applications for implementing client-side security features, programmatic client applications for interfacing with appropriate application programming interfaces (APIs) over network 460, or other types of applications. Applications 425 may also include email, texting, voice and IM applications that allow user 405 to send and receive emails, calls, and texts through network 460, as well as applications that enable the user to communicate, place orders, and make payments through the payment provider as discussed above. User device 410 includes one or more user identifiers 430 which may be implemented, for example, as operating system registry entries, cookies associated with browser application 415, identifiers associated with hardware of user device 410, or other appropriate identifiers, such as used for payment/user/device authentication. In one embodiment, user identifier 430 may be used by a payment service provider to associate user 405 with a particular account maintained by the payment provider. A communications application 422, with associated interfaces, enables user device 410 to communicate within system 400, including NFC communications with card 412.

Card issuer device 440 may be a server in communication with payment provider server 470 to communicate card information, as discussed above. Card issuer device 440 may also or alternatively be in communication with user device 410 to communicate information as described above. Card issuer device 440 may be maintained, for example, by a bank that issues card 412 for payment over network 460. Card issuer device includes a database 445 storing information about cards, such as user names, addresses, PINs, security codes, etc. Card issuer device 440 may also include a communication application 450 to enable communication with devices in system 400 through network 460.

Payment provider server 470 may be maintained, for example, by an online payment service provider which may provide payment services to user 405. In this regard, payment provider server 470 includes one or more payment applications 475 which may be configured to interact with user device 410 and/or card device 440 over network 460 to facilitate the payment services, including adding funding cards to an account as discussed above.

Payment provider server 470 also maintains a plurality of user accounts 480, each of which may include account information 485 associated with individual users. For example, account information 485 may include private financial information of users of devices such as account numbers, passwords, device identifiers, user names, addresses, phone numbers, credit card information, bank information, PINs/passwords, coupons, discounts, incentives, loyalty points, value items, or other financial information which may be used to facilitate online transactions by user 405. Funding instruments, such as credit and debit cards, may also be stored within account information 485 or another part of payment provider server 470. Advantageously, payment application 475 may be configured to interact with user 405 to make payments for the user.

A transaction processing application 490, which may be part of payment application 475 or separate, may be configured to receive information from a user device and/or card device 440 for processing and storage in a payment database 495. Transaction processing application 490 may include one or more applications to process information from user 405 for processing a request to add card 412 as described herein, as well as process a payment on behalf of user 405. As such, transaction processing application 490 may store details of an order or funding card associated with a transaction for the user.

Payment database 495 may store transaction details from completed transactions, including authorization details and/or details of the transaction, including electronic receipts. Such information may also be stored in a third party database accessible by the payment provider and/or the merchant.

Figure 5:
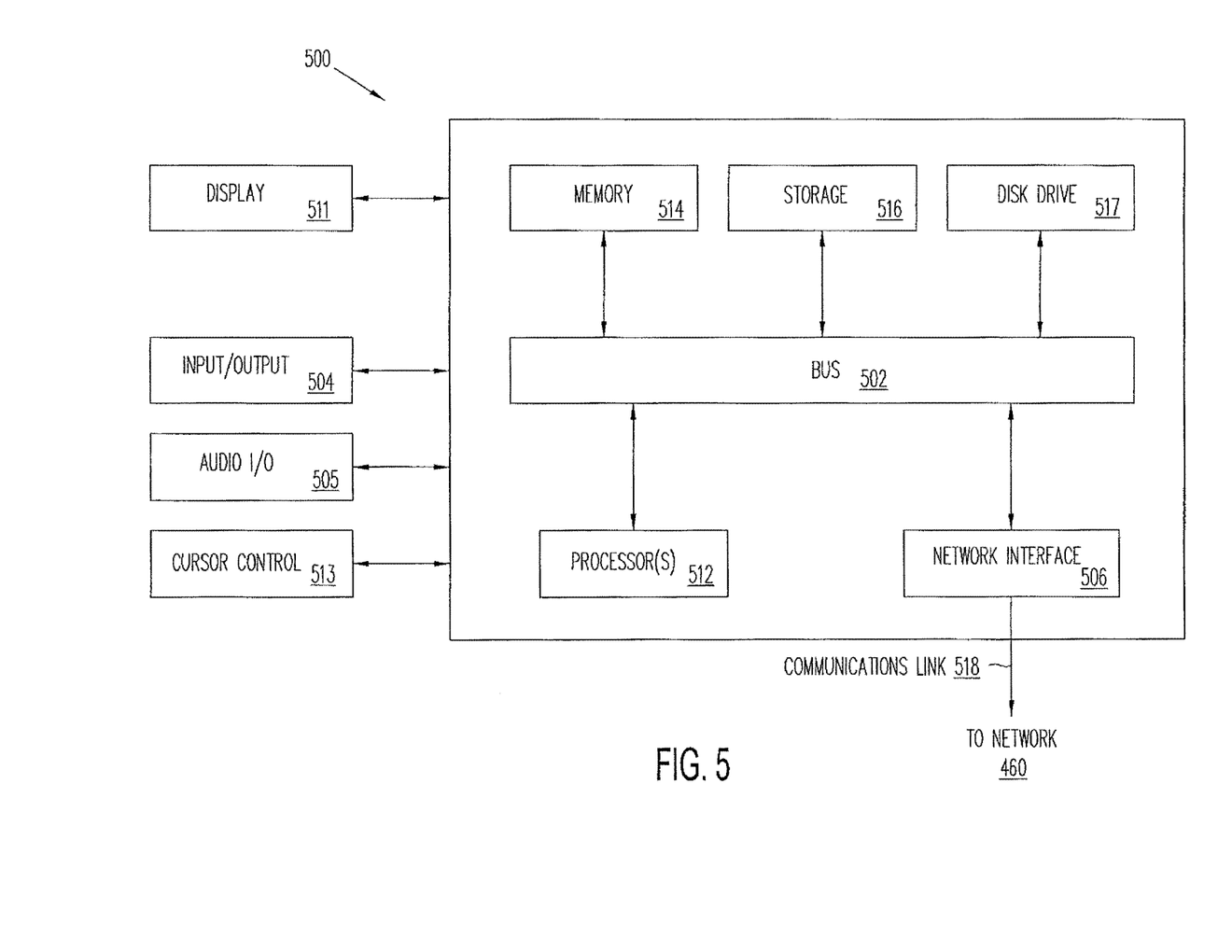
FIG. 5 is a block diagram of a computer system suitable for implementing one or more components in FIG. 4 according to one embodiment of the present disclosure.

FIG. 5 is a block diagram of a computer system 500 suitable for implementing one or more embodiments of the present disclosure. In various implementations, the user device may comprise a personal computing device (e.g., a personal computer, laptop, smart phone, PDA, Bluetooth device, key FOB, badge, etc.) capable of communicating with the network. The merchant and/or payment provider may utilize a network computing device (e.g., a network server) capable of communicating with the network. It should be appreciated that each of the devices utilized by users, merchants, and payment providers may be implemented as computer system 500 in a manner as follows.

Computer system 500 includes a bus 502 or other communication mechanism for communicating information data, signals, and information between various components of computer system 500. Components include an input/output (I/O) component 504 that processes a user action, such as selecting keys from a keypad/keyboard, selecting one or more buttons or links, etc., and sends a corresponding signal to bus 502. I/O component 504 may also include an output component, such as a display 511 and a cursor control 513 (such as a keyboard, keypad, mouse, etc.). I/O component 504 may further include NFC communication capabilities, such as an NFC reader to allow NFC communication with other devices. An optional audio input/output component 505 may also be included to allow a user to use voice for inputting information by converting audio signals. Audio I/O component 505 may allow the user to hear audio. A transceiver or network interface 506 transmits and receives signals between computer system 500 and other devices, such as another user device, a merchant server, or a payment provider server via network 560. In one embodiment, the transmission is wireless, although other transmission mediums and methods may also be suitable. One or more hardware processors 512, which can be a micro-controller, digital signal processor (DSP), or other processing component, processes these various signals, such as for display on computer system 500 or transmission to other devices via a communication link 518. Processor(s) 512 may also control transmission of information, such as cookies or IP addresses, to other devices.

Components of computer system 500 also include a system memory component 514 (e.g., RAM), a static storage component 516 (e.g., ROM), and/or a disk drive 517. Computer system 500 performs specific operations by processor(s) 512 and other components by executing one or more sequences of instructions contained in system memory component 514. Logic may be encoded in a computer readable medium, which may refer to any medium that participates in providing instructions to processor(s) 512 for execution. Such a medium may take many forms, including but not limited to, non-volatile media, volatile media, and transmission media. In various implementations, non-volatile media includes optical or magnetic disks, volatile media includes dynamic memory, such as system memory component 514, and transmission media includes coaxial cables, copper wire, and fiber optics, including wires that comprise bus 502. In one embodiment, the logic is encoded in non-transitory computer readable medium. In one example, transmission media may take the form of acoustic or light waves, such as those generated during radio wave, optical, and infrared data communications.

Some common forms of computer readable media includes, for example, floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, or any other medium from which a computer is adapted to read.

In various embodiments of the present disclosure, execution of instruction sequences to practice the present disclosure may be performed by computer system 500. In various other embodiments of the present disclosure, a plurality of computer systems 500 coupled by communication link 518 to the network (e.g., such as a LAN, WLAN, PTSN, and/or various other wired or wireless networks, including telecommunications, mobile, and cellular phone networks) may perform instruction sequences to practice the present disclosure in coordination with one another.

Where applicable, various embodiments provided by the present disclosure may be implemented using hardware, software, or combinations of hardware and software. Also, where applicable, the various hardware components and/or software components set forth herein may be combined into composite components comprising software, hardware, and/or both without departing from the spirit of the present disclosure. Where applicable, the various hardware components and/or software components set forth herein may be separated into sub-components comprising software, hardware, or both without departing from the scope of the present disclosure. In addition, where applicable, it is contemplated that software components may be implemented as hardware components and vice-versa.

Software, in accordance with the present disclosure, such as program code and/or data, may be stored on one or more computer readable mediums. It is also contemplated that software identified herein may be implemented using one or more general purpose or specific purpose computers and/or computer systems, networked and/or otherwise. Where applicable, the ordering of various steps described herein may be changed, combined into composite steps, and/or separated into sub-steps to provide features described herein.

The foregoing disclosure is not intended to limit the present disclosure to the precise forms or particular fields of use disclosed. As such, it is contemplated that various alternate embodiments and/or modifications to the present disclosure, whether explicitly described or implied herein, are possible in light of the disclosure. Having thus described embodiments of the present disclosure, persons of ordinary skill in the art will recognize that changes may be made in form and detail without departing from the scope of the present disclosure. Thus, the present disclosure is limited only by the claims.

What is claimed is:

1. A method comprising:
retrieving, by a computing device, data from a payment instrument;
causing a user interface of the computing device to display at least a portion of the data retrieved from the payment instrument with at least one account information field of a plurality of account information fields, wherein the at least one account information field is configured to receive an input to change the at least the portion of the data received from the payment instrument;
receiving, by the computer device, an authentication input in the at least one account information field of the plurality of account information fields that indicates a user identifier associated with the payment instrument;
determining, by the computing device, an authentication of the user identifier; and
causing the user interface to display an option to add the at least the portion of the data retrieved from the payment instrument to a user account accessible by the computing device based at least on the authentication of the user identifier.

2. The method of claim 1, wherein the computing device is a mobile device, and wherein retrieving the data includes establishing near field communication between the mobile device and the payment instrument.

3. The method of claim 1, wherein the user identifier comprises an address associated with the computing device, and wherein the authentication input further comprises a personal identification number (PIN).

4. The method of claim 1, wherein the authentication input further comprises a card security code associated with the payment instrument.

5. The method of claim 1, further comprising, in response to determining that the user account includes the user identifier, causing the user interface to display a second input field, wherein the second input field is automatically populated with the authentication input.

6. The method of claim 1, wherein determining the authentication of the user identifier is based on information received from a payment provider server.

7. The method of claim 1, wherein determining the authentication of the user identifier comprises determining whether the user identifier is stored in a database.

8. A system comprising:
a non-transitory memory; and
one or more hardware processors coupled to the non-transitory memory and configured to execute instructions to cause the system to perform operations comprising:
retrieving data from a payment instrument;
displaying at least a portion of the data retrieved from the payment instrument with at least one account information field of a plurality of account information fields, wherein the at least one account information field is configured to receive an input to change the at least the portion of the data received from the payment instrument;
receiving an authentication input in at least one account information field of the plurality of account information fields that indicates a user identifier associated with the payment instrument;
determining an authentication of the user identifier; and
displaying an option to add the at least the portion of the data from the payment instrument to a user account associated with a payment provider server based at least on the authentication of the user identifier.

9. The system of claim 8, wherein retrieving the data includes establishing near field communication with the payment instrument.

10. The system of claim 8, wherein the authentication input further comprises a personal identification number (PIN).

11. The system of claim 8, wherein the authentication input further comprises a card security code (CSC).

12. The system of claim 8, wherein the operations further comprise, in response to determining that the user account includes the user identifier, displaying a second input field, wherein the second input field is automatically populated with the user identifier.

13. The system of claim 8, wherein determining the authentication of the user identifier is based on information received from a payment provider server.

14. The system of claim 8, wherein determining the authentication of the user identifier comprises determining whether the user identifier is stored in a database.

15. A non-transitory machine readable medium having stored thereon machine readable instructions executable to cause a machine to perform operations comprising:
retrieving data from a payment instrument;
displaying at least a portion of the data retrieved from the payment instrument with at least one account information field of a plurality of account information fields, wherein the at least one account information field is configured to receive an input to change the at least the portion of the data received from the payment instrument;
receiving an authentication input in at least one account information field of the plurality of account information fields that indicates a user identifier associated with the payment instrument;
authenticating a user of the payment instrument based on the user identifier; and
displaying an option to add the at least the portion of the data from the payment instrument to a user account in response to authenticating the user.

16. The non-transitory machine readable medium of claim 15, wherein retrieving the data includes establishing near field communication with the payment instrument.

17. The non-transitory machine readable medium of claim 15, wherein the user identifier further comprises a personal identification number (PIN).

18. The non-transitory machine readable medium of claim 15, wherein the user identifier further comprises a card verification value (CVV) code.

19. The non-transitory machine readable medium of claim 15, wherein the operations further comprise, when the user account includes the user identifier, displaying a second input field, wherein the second input field is automatically populated with the user identifier.

20. The non-transitory machine readable medium of claim 15, wherein the user is authenticated based on information received from a payment provider server.

* * * * *